United States Patent
Mao et al.

(10) Patent No.: US 6,546,385 B1
(45) Date of Patent: Apr. 8, 2003

(54) METHOD AND APPARATUS FOR INDEXING AND SEARCHING CONTENT IN HARDCOPY DOCUMENTS

(75) Inventors: Jianchang Mao, San Jose, CA (US); Carlton Wayne Niblack, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/374,380

(22) Filed: Aug. 13, 1999

(51) Int. Cl.[7] .............................................. G06F 17/30
(52) U.S. Cl. ........................... 707/3; 707/500; 382/248
(58) Field of Search .................... 707/506, 530, 707/501, 1–10, 101–104, 513, 204; 705/408; 382/305, 232–33, 54; 380/54

(56) References Cited

U.S. PATENT DOCUMENTS

| | | | |
|---|---|---|---|
| 5,317,646 A | | 5/1994 | Sang, Jr. et al. |
| 5,333,237 A | | 7/1994 | Stefanopoulos et al. |
| 5,367,621 A | * | 11/1994 | Cohen et al. ................ 707/501 |
| 5,436,627 A | | 7/1995 | Motoyama et al. |
| 5,486,686 A | | 1/1996 | Zdybel, Jr. et al. |
| 5,557,722 A | | 9/1996 | DeRose et al. |
| 5,624,265 A | | 4/1997 | Redford et al. |
| 5,644,408 A | | 7/1997 | Li et al. |
| 5,701,498 A | | 12/1997 | Goach, Jr. et al. |
| 5,754,308 A | | 5/1998 | Lopresti et al. |
| 5,760,382 A | | 6/1998 | Li et al. |
| 5,761,485 A | | 6/1998 | Munyan |
| 5,781,914 A | * | 7/1998 | Stork et al. ................. 707/506 |
| 5,788,507 A | | 8/1998 | Redford et al. |
| 6,006,217 A | * | 12/1999 | Lumsden ..................... 707/103 |
| 6,055,540 A | * | 4/2000 | Snow et al. ................. 707/103 |
| 6,092,090 A | * | 7/2000 | Payne et al. ................. 707/530 |

OTHER PUBLICATIONS

Hiroshi Goto, Si Mircromachined 2D Optical Scanning Mirror and its Application to Scanning Sensors, Aug. 1996, pp. 17–18.*

Rembold, D., Belogroudov, V., Worn, H; Object Turning for Barcode Search; Oct. 31–Nov. 5, 2000, vol. 2; pp. 1267–1272.*

* cited by examiner

Primary Examiner—John Breene
Assistant Examiner—Mohammad Ali
(74) Attorney, Agent, or Firm—Jose Gutman; Fleit, Kain, Gibbons, Gutman & Bongini P. L.

(57) ABSTRACT

A method and apparatus for indexing and searching content in a hardcopy document utilizes a searching assistant computing device (402) with an index table (420) stored in memory (412). The index table (420) is created in memory by scanning a 2-D barcode from a hardcopy document or alternatively by downloading indexing information from a web page via the Internet (430). A search engine (410) in the searching assistant (402) searches the index table (420) to locate a data element found in the content of the hardcopy document. The indexing information corresponding to the data element is displayed to a user as part of the search results to indicate the location of the data element in the hardcopy document.

21 Claims, 5 Drawing Sheets

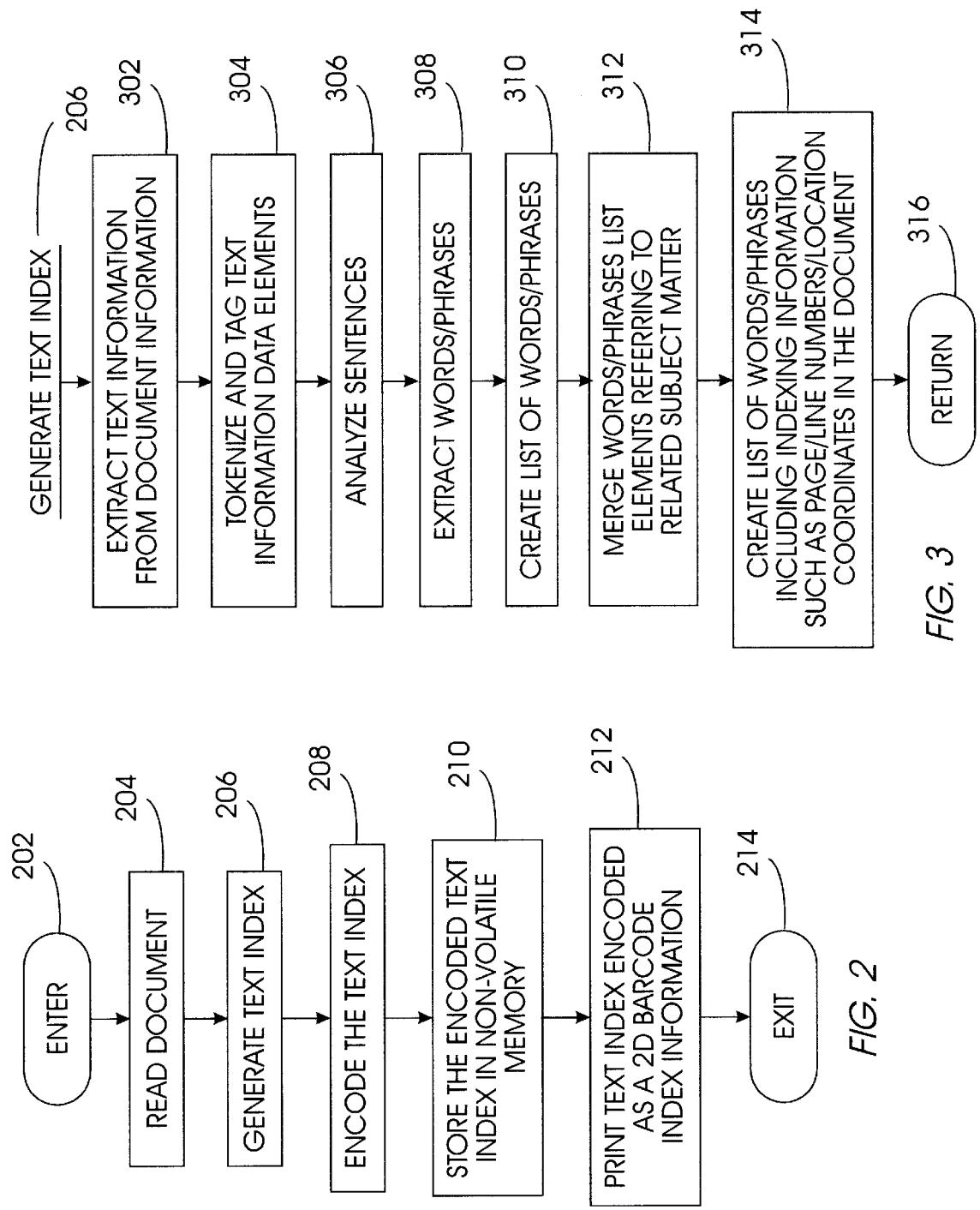

METHOD AND APPARATUS FOR INDEXING AND SEARCHING CONTENT IN HARDCOPY DOCUMENTS

BACKGROUND OF THE INVENTION

1. Field of the Invention

This invention relates in general to methods for indexing and searching hardcopy documents, and more particularly to a method and apparatus for electronically indexing data elements in a hardcopy book or document and thereby searching and locating a particular data element in the hardcopy book or document.

2. Description of the Prior Art

Although electronic available books, such as available online, may have extensive indexing features when read via a computing device, unfortunately, hardcopy documents have not benefitted from sophisticated indexing and searching capability.

Conventionally, hardcopy documents, typically a book, are searched to find information they contain by using a table of contents or index, if available, and manually searching all data elements in the hardcopy document. Many kinds of books, for example novels, may not include an index or table of contents, and others, such as computer language reference books, are written fairly rapidly and include an index section and a table of contents section that are often not very complete.

Since the index typically is not complete, if one needs to look up something in the hardcopy document or book, the indexing mechanism in the back of the book may not be very helpful. Full text indexing, for example, is too big to include with the book. A complete index may require as much as an additional one third of the size of an associated book if printed along with the book. So readers in the past have had to accept this problem and rely on a subset of a full index in a book to assist in searching the book in order to keep the size of the hardcopy document or book to a commercially acceptable volume.

Other hardcopy documents, such as electrical drawings and maps, include data elements other than text, such as graphics, and suffer from a similar disadvantage of not being fully indexed and their data elements are not easily located or searched for. For example, a person may wish to locate a specific transistor in a complex circuit depicted in an electrical drawing or blueprint. Regrettably, the person would have to exhaustively search all data elements in the electrical drawing to locate the transistor without the benefit of an indexed search. It has been commercially impractical to provide a complete hardcopy index.

Additionally, since users in the past have only been able to manually search hardcopy documents by reading the limited index tables printed in the hardcopy document, the type of manual searching is limited typically to a linear alphabetical search of an index table. It is unfortunate that neither more complete searching nor more complex searching methods are available to hardcopy readers. For example, prior to the present invention it would have been impracticable for a reader of a hardcopy document to engage in complex boolean searching of multiple data elements in a hardcopy document.

Hardcopy documents, however, have distinct advantages. They are pleasant to read, easy to annotate, viewing distance and angle can be easily adjusted, they do not require network connectivity or depend on network speed, they are mobile, and so on. Hardcopy books, even in technical areas, will be popular for a long time.

Accordingly, there is a need for a method and apparatus to eliminate those specific disadvantages of the prior art as discussed above, and particularly to significantly enhance the ability of a person to index search a hardcopy document.

BRIEF DESCRIPTION OF THE DRAWINGS

FIGS. 2 and 3 are operational flow diagrams illustrating operations of the system of FIG. 1 according to a preferred embodiment of the present invention.

DESCRIPTION OF A PREFERRED EMBODIMENT

Figure 1:
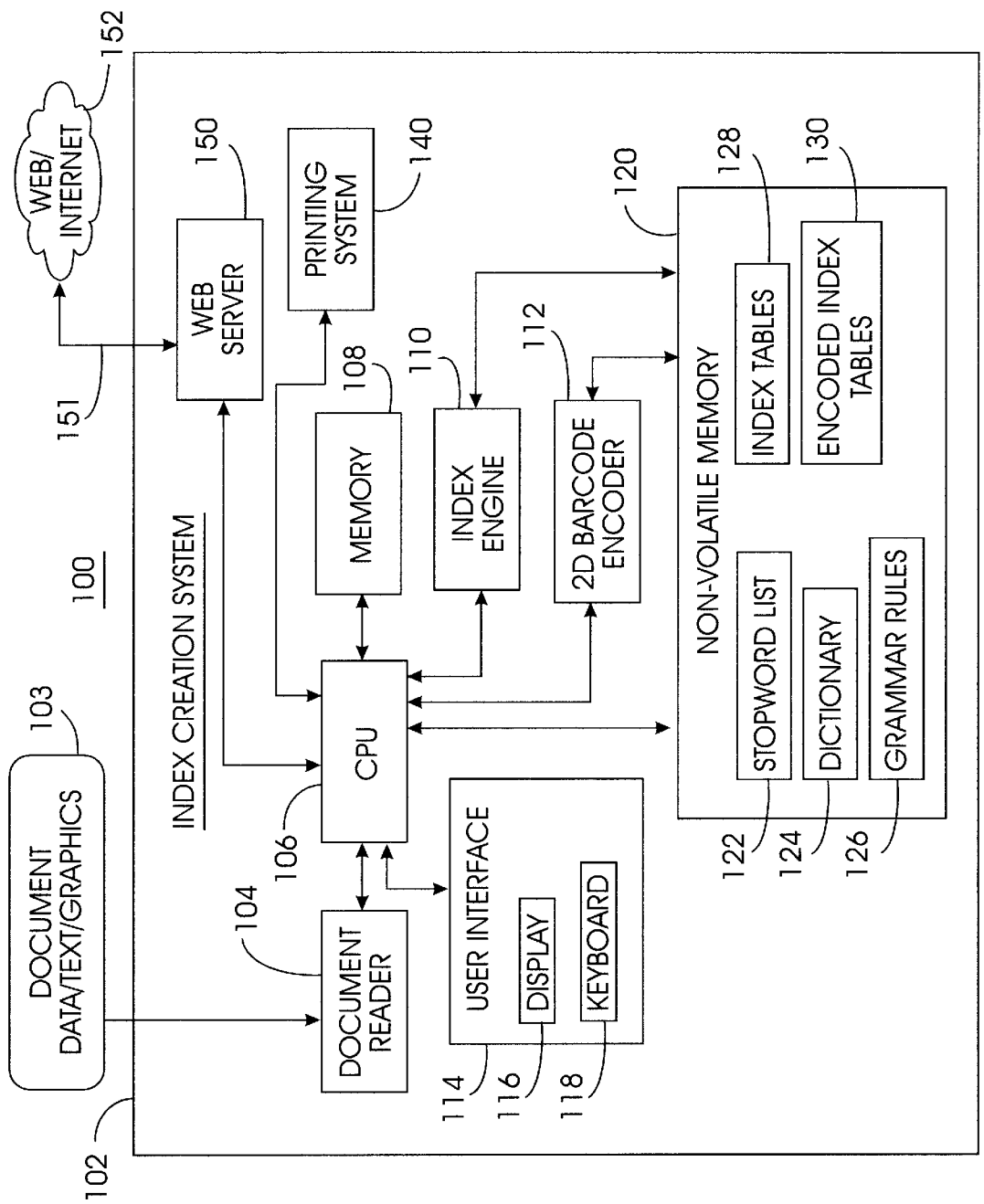
FIG. 1 is a block diagram of a hardcopy document delivery system, including, in particular, and index creation system according to a preferred embodiment of the present invention.

The present invention solves the aforementioned problems by providing a means that allows a person to feasiblely perform much more exhaustive searching on hardcopy documents. Preferably, an index is compressed, encoded, and stored in a computer readable medium, and a computing device, such as a hand-held computing device, reads, decodes, and decompresses the information from the index and makes it available to a user of the device for searching the hardcopy document.

In one preferred embodiment of the present invention, the compressed complete index, or nearly complete index, can be printed in a computer readable format such as a 2D bar code as part of a hardcopy book. A user of the computing device can extract information from the index and use it to search the book. In a second embodiment, the full index or partial index information can be stored on the World Wide Web, and downloaded to a user's computing device, and used as above. Advantages of the present invention include:

First, one can provide a much more complete index, just for space reasons, than one would have found reasonable in the past to print in the back of a book because the more complete index is compressed, allowing storage of much more information in a relatively small volume, e.g., relatively few pages in the book. A user using a hand-held computing device, for example, can efficiently utilize a complete, or near complete, index for a book to get essentially full-text searching of the book. The index information can be stored in the back of book in a reasonable amount of space.

Second, because the complete index is readable by the computing device, a user can do complex searches of the book. For example, the user can search for "dog" and "cat" in the same paragraph. This type of searching would not have been possible using a static hardcopy printed index in a book. Further, the present invention allows boolean searches (combining terms with "and", "or", "not", etc.), fuzzy/approximate searches, use of associated terms for query expansion, and so on.

Thirdly, a computing device assisted search of a hardcopy document can provide detailed location information of occurrence of a data element being searched for by the user. In the past, a user looking for a word in a book might only have a page number identified in an index in the book. Then, the user would have to scan the page to find the indexed word. This wasted significant time during searching. With the present invention, the index can, for example, provide chapter location, page number location, line number on a page location, etc., and searching and locating can be as accurate as desired and still be able to fit into a reasonable volume of printed material such as in the back of a book.

Furthermore, in the case that hardcopy document is not a book, for example it is a large engineering blueprint draft, an index can be provided that indicates, for example, where certain resistors are located in the hardcopy document, such as via a fine grid (X,Y) coordinate system representation.

Therefore, for example, by combining complete or near complete index information in a computer readable medium with a small computing device, the user can utilize the indexing information to perform complex and complete or nearly complete searches on an associated hardcopy document.

The index creation system 102 in FIG. 1 and the searching assistant system 402 in FIG. 4, each comprises computing systems that normally include at least one computing device and at least one computer readable medium as will be discussed more fully below. Each computing system includes, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits. Furthermore, the computer readable medium may include computer readable information in a transitory state medium such as a network link and/or a network interface, including a wired network or a wireless network, that allow a computer to read such computer readable information.

Referring to FIG. 1, the document delivery system 100 provides hard copy documents with full indexing capability for readers thereof. The document data such as text or graphics 103 is provided to an index creation system 102 to create an index for the resulting hard copy document such that a reader of the document could use the index to search the hard copy document for specific data elements such as text and graphics elements in the hard copy document. The document data text or graphics 103 preferably is provided electronically to the index creation system 102. However, alternatively, the document data 103 could be read into the index creation system 102 by a document reader 104, which is equipped with an OCR (Optical Character Recognition) engine for converting hardcopy documents to ASCII text. Once the document data, e.g., text and graphics, 103 is read by the index creation system 102, it is temporarily stored in a memory 108 to further process the document data 103 to create an index table therefrom. The central processing unit 106 is coupled to the document reader 104 and to the memory 108 for providing computing function to the index creation system 102, such as for storing the document data 103 that is read by the document reader 104 into the memory 108. The CPU 106 is also coupled to an index engine 110 which provides the functions for creating the index table as will be discussed below. The CPU 106 is also coupled to a two-dimensional bar code encoder 112 and to the non-volatile memory 120. The two-dimensional bar code encoder 112 creates a compressed version of the index tables in a two-dimensional bar code format which is then stored in the non-volatile memory 120 in the encoded index tables portion thereof 130. This will also be more fully discussed below. The CPU 106 is also coupled to a user interface 114 which preferably includes a display 116 and a keyboard 118 for communicating with a user of the index creation system 102. The non-volatile memory 120 also includes storage for a stop word list 122 for a dictionary 124 for a set of grammar rules 126 and it stores the index tables 128 in a non-compressed format as well. It can store the encoded index tables, such as the two-dimensional bar code encoded index tables in a portion 130 of the non-volatile memory 120. The CPU 106 is also coupled to a printing system 140 to print the resulting hard copy index tables preferably in a two-dimensional bar code encoded format.

Additionally, in the preferred embodiment, the printing system 140 prints the hard copy document data text and graphics 103 along with a hard copy representation of the two-dimensional bar code encoded index tables to create a complete indexed hard copy document. This hard copy document can then be distributed to readers and users who can efficiently search the hard copy document as will be more fully discussed below. Alternatively, the index creation system 102 includes a web server 150 which is coupled to the CPU 106 and also coupled via a communication link 151 to the Internet World Wide Web 152. This web server 150 can provide an electronic version of the index tables 128, such as on a web page for a publisher of the hard copy document. In this way, as will be more fully discussed below, a reader of the hard copy document is able to download from the Internet the electronic index tables for the hard copy document to be used for searching the hard copy document as needed.

In the preferred embodiment, the index engine 110 operates to extract the data elements from the document, such as the words, sentences, phrases and graphic elements from the document data 103 and following certain indexing rules creates the index tables 128 for the hard copy document. These indexing rules, for example, will ignore stop-word list words 122, such as the words "a", "the", "and", etc. which do not contain relevant context for indexing or searching in a hard copy document. The index engine 110 utilizes a dictionary 124 and a set of grammar rules 126 to parse through the data elements of the document and capture a set of indexable data elements such as text, words, phrases or sentences to include in the index tables 128.

With reference to FIG. 2, the index creation system 102 operates to create the index tables and to print the two-dimensionally encoded bar code index tables along with the hard copy document. With reference to FIG. 3, a more detailed description of the functional steps involved in generating the text index are illustrated. specifically, starting with FIG. 2, the index creation system 102 upon commencing an index creation operation reads the data elements of the hard copy document at Steps 202, 204, and then generates a text index set of tables at Step 206, as will be discussed below. The two-dimensional bar code encoder 112 then takes the index table information 128 and encodes the text index, for example, into an encoded index table 130, at Step 208. The encoded index table 130 is then stored in the non-volatile memory 120 for subsequent use by the index creation system 102. The index creation system 102 then controls the printing system 140 and provides the encoded index tables 130 to the printing system 140 to print the text index encoded as a two-dimensional bar code index table information along with the hard copy document, at Step 212 and then exits the printing at Step 214. In this way, the index creation system takes document data such as text and/or graphics at 103 and prints a table including index information for a hard copy document that can be read and used by readers of the hard copy document as will be discussed in more detail below.

As shown in FIG. 3, the index table generation Step 206 includes the steps of extracting text information from the document information at Step 302, then tokenizing and tagging the text information data elements such as words and phrases at Step 304, and then further analyzing sentences for context at Step 306. Once the sentences have been analyzed, the system extracts words and phrases at Step 308 and then at Step 310 it creates a list of these words and phrases that will be indexed into the hard copy document.

This list of words usually includes multiple occurrences (for multiple locations) of the same word or phrase in the document data elements and so there is a merging step at Step 312 where the multiple occurrences are consolidated into a single entry in the table for each word and/or phrase in the list that is to be indexed. Lastly, at Step 314, the system creates a complete list of words, phrases and other data elements for the hard copy document and includes indexing information such as page number, line number and possibly coordinates such as X and Y to locate the data element in the hard copy document. Once the index table with the indexing information is built, at Step 314, the system returns at Step 316 to continue the index table printing operation, as discussed with reference to FIG. 2.

Figure 4:
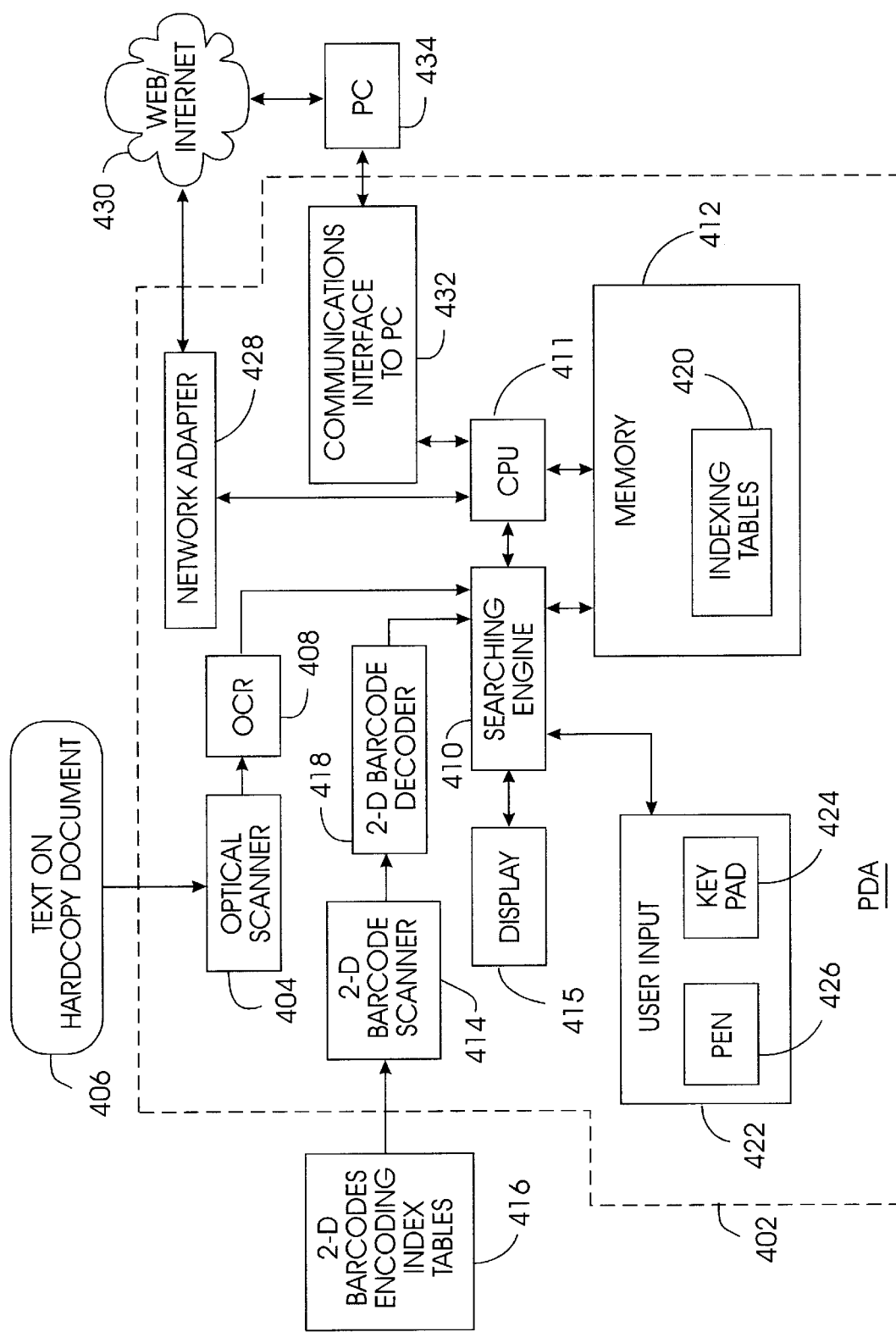
FIG. 4 is a block diagram showing an exemplary searching assistant computing device for use in accordance with a preferred embodiment of the present invention.

FIG. 4 illustrates a searching assistant computing device 402, such as provided with a personal digital assistant, a hand-held computing device, or the like. In one embodiment, the searching assistant 402 includes a two-dimensional bar code scanner 414 which is coupled to a two-dimensional bar code decoder 418 for scanning and decoding printed hard copy two-dimensional bar codes index tables 416 that are included with a hard copy document. The device 402 also may include an optical scanner 404 and an optical character recognition module 408 for optically scanning text and/or data elements from a hard copy document 406, as will be discussed below. The searching assistant 402 also includes a display 415 for communicating information to a user of the searching assistant system 402 and it includes a user input 422 such as including a keypad 424 and a pen input device 426 for capturing input from the user of the searching assistant device 402. A searching engine module 410 is coupled to a CPU 411 for handling the searching functions for the searching assistant device 402 as will be discussed in more detail below. A memory 412 coupled to the searching engine 410 into the CPU 411 stores indexing tables 420 which can be searched and used to provide indexing information to a reader of the hard copy document.

Additionally, a network adapter 428 is coupled to the CPU and can be coupled via a link to the web Internet 430 for downloading index table information such as from a web page being hosted by a publisher of the hard copy document. In this way, a publisher of the hard copy document, for example, can provide indexing information to readers so the readers can efficiently search the hard copy documents provided by the publisher. The searching assistant 402 in this example is capable of downloading such indexing information from a web page provided by a publisher of the hard copy document via the Internet 430.

Alternatively, the searching assistant 402 includes a communications interface to a personal computer 432 such that the interface 432 interfaces to a personal computer 434 that can then link up an interface with the Internet or web 430 and thereby access and download from the publisher's web page the index table information for particular hard copy documents. The index table information can be downloaded from the web 430 via either the network adapter 428 or via the personal computer and interface 434 and 434(?) and then stored in the memory 412 in an index table portion of the memory 420. In this way, the searching assistant 402 is capable of storing the indexing table information 420 in the memory 412 by downloading from the web 430 either via the network adapter 428 or via a personal computer 434 coupled to the communications interface 432 or the searching assistant 402 can scan the two-dimensional bar codes provided with the hard copy document 416 and then decode those two-dimensional bar codes to provide the indexing information to store in the memory 412 in the location for the indexing tables 420.

Once the indexing information is in the indexing tables 420 in the memory 412, the searching assistant 402 can accept user input 422 such as via pen input 426 or keypad input 424 and can display search results via the display 415. In this way, a user of the searching assistant 402 can search a hard copy document for specific data elements such as text and/or graphics as will be discussed below.

Figure 6:
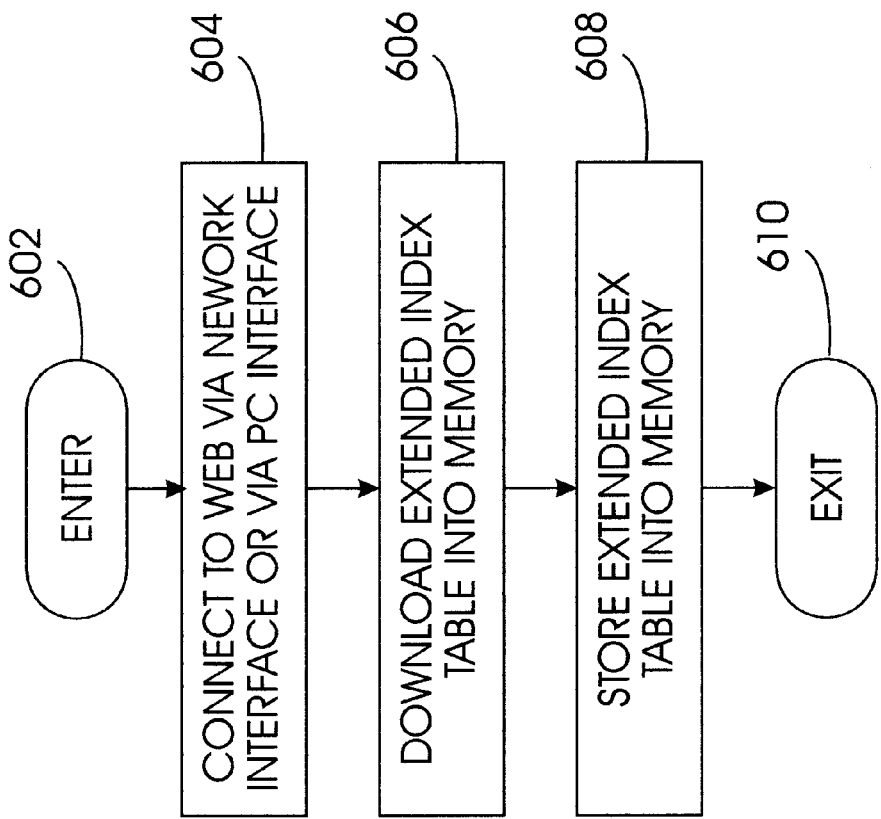
FIGS. 5, 6, and 7, are operational flow diagrams illustrating operations for the searching assistant computing device shown in FIG. 4 according to a preferred embodiment of the present invention.
Figure 5:
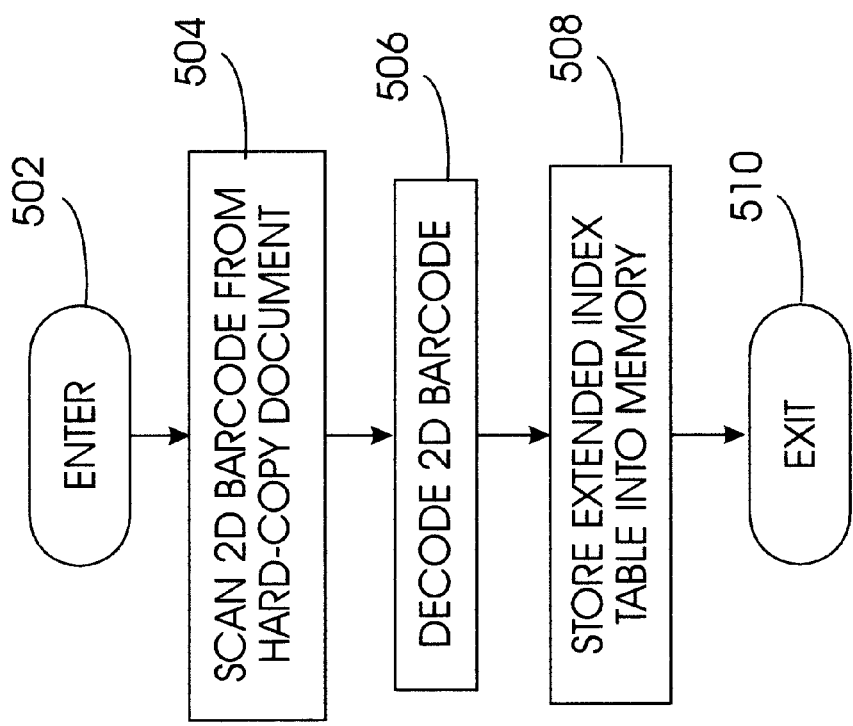

With reference to FIG. 5, the searching assistant 402 operates to store indexing information into an index table in memory 412. The searching assistant 402 at Steps 502 and 504 scans the two-dimensional bar code information from the hard copy document at Step 504 and then decodes the two-dimensional bar code information at Step 506 and then stores the decoded two-dimensional bar code information into the index table in the memory 412 at Steps 508 and 510. In this way, the two-dimensional bar code information is read from the hard copy document and stored into the indexing tables 420 in the memory 412 in the searching assistant 402. This is a preferred mode of operation for the searching assistant 402. Specifically, this allows indexing of hard copy documents even without having access to the Internet or to any electronic network because the indexing information is available in hard copy form along with the hard copy document. By utilizing two-dimensional barcodes, it compresses the indexing information and significantly saves on hard copy document volume which is important to make this a usable system for indexing information from hard copy documents. In one preferred mode, the indexing information is organized into multiple index tables such as an index table for each alphabetical letter of indexing such as A, B, C, and so on for each letter of the alphabet having a specific index table thereby a user of the index table can tab or index into a particular alphabetical first letter of a piece of text that is being searched for. These indexing tables are efficiently stored on hard copy in a compressed two-dimensional format. They require very few pages preferably in the back of a hard copy document and allow a reader to have powerful and extensive searching function as will be discussed below. With reference to FIG. 6, an alternative mode of storing the indexing information in the indexing tables 420 and the memory 412, includes the steps of connecting to the web 430 via a network interface 428 or via a personal computer interface 432 as was discussed above, at Steps 602 and 604. Then the searching assistant 402 downloads extended index table information from the web 430 such as from a web page for the publisher of the hard copy document, at Step 606, and stores the downloaded information into the memory 412 into the indexing table portion 420, at Step 608 and 610. In this way, an electronic download of indexing information from a publisher's web page via the web 430 can be then stored into the memory 412 in the indexing tables portion 420 for use by the searching assistant 402 in assisting a user to search via indexing a hard copy document.

Figure 7:
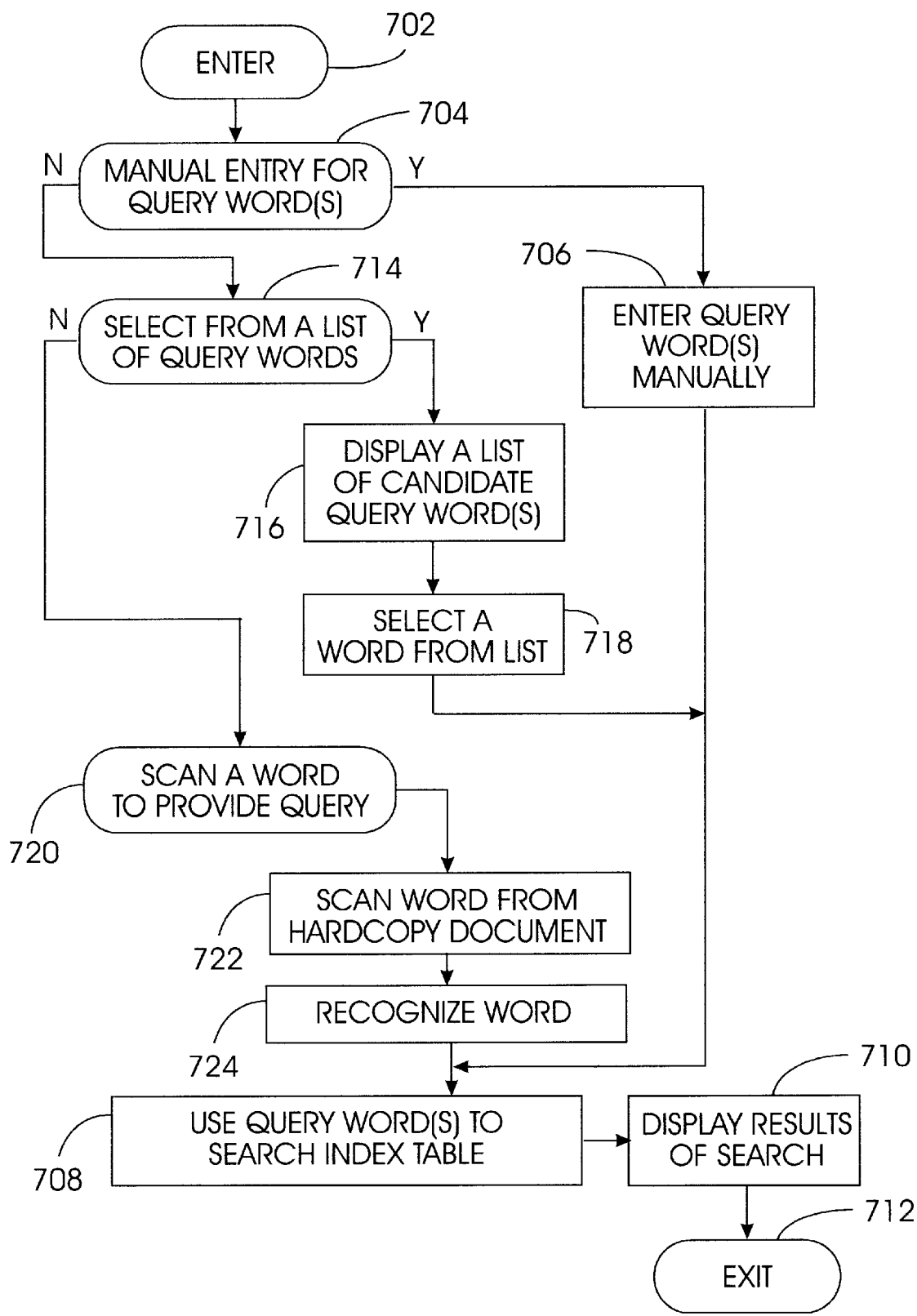

Referring to FIG. 7, the searching assistant 402 can be utilized to assist a reader of a hard copy document to search efficiently the hard copy document via indexing information stored in the indexing tables 420 and the memory 412. Specifically, at Steps 702 and 704, the searching assistant verifies whether the user, i.e., the reader of the hard copy document, is requesting a manual entry for search words or query words to index into the document. If the user, at Step 704, enters certain query words or search words for indexing, then at Step 706 the searching assistant 402 accepts the query words from manual entry via the user input 422 and then at Step 708, the searching assistant 402 searches with the searching engine 410 to find the particular index entries in the index table 420, at Step 708. Then, at Step 710, the searching assistant 402 displays a result of the search to the user, at Step 710, and then exits the searching operation at Step 712.

Alternatively, the searching assistant 402 may receive a request from a user, at Step 714, to select a query word from a list of available words. This facilitates entry for a user by merely selecting a word on the display that is already available for selection. If the user selects from a list of query words, at Step 714, then the searching assistant 402 displays the list of candidate query words, at Step 716, and then accepts a selection from the user for one of the entries on the list being displayed, at Step 718. Subsequently, searching assistant 402 at Step 708 uses the selected query words to search the index table and then at Step 710 displays results of the search and exists at Step 712. A third alternative means of selecting query words for the searching assistant 402, i.e., for the exemplary embodiment including an OCR scanner and decoding software, allows the user to scan for a word from the hard copy document such as selected at Step 720. In such event, if the user desires to scan a word and makes the selection at Step 720, the searching assistant, at Step 722, scans a word from the hard copy document at Step 722 such as using the optical scanner 404 and the optical character recognition module 408 to provide the query word for the search function. After the word is scanned at Step 722, the searching assistant 402 does the recognition of the word at Step 724 and then provides the query word for a searching operation at Step 708. Once the word is searched in the index table at Step 708, the searching assistant 402 displays the results of the search at Step 710 and then exits at Step 712. In this way, as illustrated above, the searching assistant 402 is able to assist a reader of a hard copy document in a number of ways to search the indexing tables information 420 from the memory 412 to provide efficient searching within a hard copy document for a user of the device 402. Additionally, complicated boolean searching can be accomplished which is not available in any conventional index table implementation using purely hard copy documents and hard copy printed index tables.

Therefore, as has been discussed above, a user of the searching assistant 402 is capable of reading a book or a hard copy document anywhere, and conveniently scanning the hard copy document for indexing information and then using the indexing information from the hard copy document or book to search into the book for particular data elements or words in the book without requiring any network connection to download information.

Additionally, the searching can be done with an extensive indexing function that can locate not only pages and line number as is commonly accomplished, but additionally it can locate specific coordinates in a hard copy document. For example, a resistor element may be located in a particular blueprint hard copy document by an X and Y coordinate. Additionally, a map can be indexed to locate a particular map element such as a city or road or intersection precisely with a coordinate location for the data element. This is accomplished effectively and efficiently via the searching assistant 402 and the index information which preferably is compressed and encoded and stored and printed in a hard copy format along with the hard copy document.

Alternatively, from a publisher's web page, a user can download an ASCII file, for example, to include all the indexing information required for a hard copy document in an index table 420 in the memory 412 of the searching assistant 402. In this way, the user can search efficiently the hard copy document by indexing using the searching assistant 402.

This efficient searching feature is a significant advantage of the present invention that it is not available in any known prior art hard copy indexing system. A user can scan for individual text elements, for example, the word "java", or can search for more complex groups of words, such as "java virtual machine". Additionally, the user can obtain detailed specific location information for particular data elements such as a word or phrase within a document. Furthermore, the user can search for combinations of words such as "cat" but not "dog" in the same paragraph. These types of complex boolean searching are unheard of in any conventional hard copy indexing system.

Although specific embodiments of the invention have been disclosed, it will be understood by those having skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A system for index searching content in a hardcopy document comprising:

a display for displaying information to a user;

a user input for accepting input from the user;

a memory for storing indexing information, the indexing information comprising index entries that are searchable by a search engine, each of the index entries identifying at least one data element and its specific location in a hardcopy document;

a search engine electrically coupled to the display, the user input, and the memory, for searching the indexing information, in response to an input from the user requesting the specific location of a data element in the hardcopy document, to find at least one of the index entries in the indexing information identifying the requested data element and its specific location in the hardcopy document, to display to the user a representation of the specific location in the hardcopy document of the found at least one of the index entries in the indexing information to identify to the user the specific location of the requested data element in the hardcopy document;

a barcode scanner for scanning barcode encoded indexing information from a hardcopy document; and a barcode decoder electrically coupled to the barcode scanner and to the memory for decoding barcode encoded information from the barcode scanner and for storing the decoded indexing information in the memory, the indexing information being searchable by the search engine to find the requested data element in the hardcopy document.

2. The system of claim 1, wherein:

the barcode scanner comprises a 2-D barcode scanner for scanning 2-D barcode encoded indexing information from a hardcopy document; and the barcode decoder comprises a 2-D barcode decoder electrically coupled to the 2-D barcode scanner and to the memory for decoding 2-D barcode encoded information from the 2-D barcode scanner and for storing the decoded indexing information in the memory, the indexing information being searchable by the search engine to find the requested data element in the hardcopy document.

3. The system of claim 1, further comprising:

a network interface electrically coupled to the memory for downloading indexing information from a network server and for storing the downloaded indexing information in the memory, the indexing information being searchable by the search engine to locate the one data element.

4. The system of claim 3, wherein the network server comprises a web page server on a wide area network, and the network interface downloads the indexing information from the web page server via the wide area network.

5. The system of claim 1, further comprising:

a personal computer (PC) communications interface electrically coupled to the memory for downloading indexing information from a PC and for storing the downloaded indexing information in the memory, the indexing information being searchable by the search engine to locate the one data element.

6. The system of claim 5, wherein the PC comprises a network interface for downloading indexing information via the PC from a web page server over the Internet, the indexing information being downloaded via the PC and stored in the memory, the indexing information being searchable by the search engine to locate the one data element.

7. The system according to claim 1, further comprising:

user input means for accepting input from the user, the user input means being electrically coupled to the search engine and in response to accepting input from the user the search engine searching the indexing information to locate one data element of the at least one data element and displaying indexing information corresponding to the one data element as part of the results of the search.

8. The system of claim 7, wherein the display displays a list of candidate data elements to search and the user input comprises a selection of one candidate data element from the list, the search engine searching the indexing information to locate the one candidate data element and the display displaying indexing information corresponding to the one candidate data element as part of the results of the search.

9. The system of claim 1, further comprising:

an optical scanner for scanning data elements from a hardcopy document; and an optical character recognition module electronically coupled to the optical scanner and to the search engine for extracting text information corresponding to at least one data element scanned by the optical scanner, the search engine searching the indexing information to locate the at least one data element corresponding to the text information and displaying indexing information corresponding to the at least one data element as part of the results of the search.

10. A system comprising:

a display for displaying information to a user;

a memory for storing indexing information corresponding to at least one data element that is part of content in a hardcopy document; and a search engine electrically coupled to the display and the memory, for searching the indexing information to locate one data element of the at least one data element that is part of the content in a hardcopy document and displaying indexing information corresponding to the one data element as part of the results of the search, and wherein the search engine performs a boolean search of the indexing information to locate the one data element of the at least one data element.

11. A method comprising the steps of:

reading data elements from the content of a document;

creating an index table including index entries that are searchable by a search engine, each of the index entries identifying at least one of the data elements and its specific location in a hardcopy representation of the document, a representation of an index entry found by the search engine in the index table being displayable to a person to identify to the person the specific location of an associated at least one of the data elements in the hardcopy representation of the document; and printing a compressed hardcopy representation of the index table in a 2-D barcode encoded form on a hardcopy document for a 2-D barcode scanner to scan 2-D barcode encoded information from the 2-D barcode encoded form of the index table on the hardcopy document; and a 2-D barcode decoder to decode the 2-D barcode encoded information from the 2-D barcode scanner for storing the decoded indexing information in memory, the indexing information being searchable by a search engine to find a requested data element in the hardcopy document.

12. The method of claim 11, wherein the compressed hardcopy representation comprises a 2-D barcode representation, and wherein the printing step prints a 2-D barcode representation of the index table on the hardcopy document.

13. A method comprising the steps of:

downloading, from a network server, indexing information comprising index entries that are searchable by a search engine, each of the index entries identifying at least one data element and its specific location in a hardcopy document;

storing the indexing information in a memory;

in response to a user request for a specific location of a data element in the hardcopy document, searching the indexing information to find an index entry that identifies the specific location in the hardcopy document of the requested data element; and displaying to the user a representation of the found index entry to identify to the user the specific location in the hardcopy document of the requested data element; and wherein the indexing information is stored in the network server after being created from at least one of reading and scanning at least one of a 2-D barcode encoded information from a hardcopy document and a representation of the hardcopy document.

14. The method of claim 13, wherein the downloading step comprises the step of downloading the indexing information via the Internet from a web server.

15. The method of claim 13, further comprising the step of accepting user input from a user to create a search query, the searching step searching the indexing information, in accordance with the search query, to locate at least one data element in a hardcopy document that includes the content.

16. A computer readable medium including computer instruction for:

downloading, from a network server, indexing information comprising index entries that are searchable by a search engine, each of the index entries identifying at least one data element and its specific location in a hardcopy document;

storing the indexing information in a memory;

in response to a user request for a specific location of a data element in the hardcopy document, searching the indexing information to find an index entry that identifies the specific location in the hardcopy document of the requested data element; and displaying to the user a representation of the found index entry to identify to the user the specific location in the hardcopy document of the requested data element; and wherein the indexing information is stored in the network server after being created from at least one of reading and scanning at least one of a 2-D barcode encoded information from a hardcopy document and a representation of the hardcopy document.

17. The computer readable medium of claim 16, further including computer instructions for:

accepting user input from a user to create a search query, and searching the indexing information, in accordance with the search query, to locate at least one data element in a hardcopy document that includes the content.

18. A computer readable medium including computer instructions for:

scanning a 2-D barcode information to extract indexing information comprising index entries that are searchable by a search engine, each of the index entries identifying at least one data element and its specific location in a hardcopy document;

storing the indexing information in a memory;

in response to a user request for a specific location of a data element in the hardcopy document, searching the indexing information to find an index entry that identifies the specific location in the hardcopy document of the requested data element; and displaying to the user a representation of the found index entry to identify to the user the specific location in the hardcopy document of the requested data element; and wherein the scanning step comprises the steps of:

scanning 2-D barcode encoded information from a hardcopy document; and decoding the scanned 2-D barcode encoded information to extract the indexing information for storing the decoded indexing information in the memory.

19. The computer readable medium of claim 18, further including computer instructions for:

accepting user input from a user to create a search query, and searching the indexing information, in accordance with the search query, to locate at least one data element in a hardcopy document that includes the content.

20. A method comprising the steps of:

reading data elements from the content of a document;

creating an index table including index entries that are searchable by a search engine, each of the index entries identifying at least one of the data elements and its specific location in a hardcopy representation of the document, a representation of an index entry found by the search engine in the index table being displayable to a person to identify to the person the specific location of an associated at least one of the data elements in the hardcopy representation of the document; and printing a compressed hardcopy representation of the index table associated with the hardcopy document that allows a searching assistant equipped with a computing system to read the hardcopy representation of the index table and to search the index entries to find an index entry that identifies the specific location in the hardcopy document of a data element requested by a user and to display a representation of the index entry to the user; and wherein the compressed hardcopy representation of the index table is printed as barcode encoded information on a hardcopy document.

21. The method according to claim 20, wherein the compressed hardcopy representation of the index table comprises a 2-D barcode hardcopy representation of the index table.

* * * * *